(12) United States Patent
Gurney et al.

(10) Patent No.: US 6,745,315 B2
(45) Date of Patent: Jun. 1, 2004

(54) GENERATION OF ADDRESS PATTERN THROUGH EMPLOYMENT OF ONE OR MORE PARAMETERS TO STORE INFORMATION AT PARTS OF STORAGE THAT ARE EMPLOYABLE WITH MULTIPROCESSING

(75) Inventors: David P. Gurney, Algonquin, IL (US); Vipul Anil Desai, Hoffman Estates, IL (US)

(73) Assignee: Motorola Inc., Schaumburg, IL (US)

( * ) Notice: Subject to any disclaimer, the term of this patent is extended or adjusted under 35 U.S.C. 154(b) by 261 days.

(21) Appl. No.: 09/929,373

(22) Filed: Aug. 14, 2001

(65) Prior Publication Data

US 2003/0037218 A1 Feb. 20, 2003

(51) Int. Cl.[7] ................................................ G06F 12/00
(52) U.S. Cl. ........................ 711/217; 711/217; 711/218; 712/204
(58) Field of Search ................................ 711/217, 218; 712/204

(56) References Cited

U.S. PATENT DOCUMENTS

| 4,101,960 A | | 7/1978 | Stokes et al. | |
| 4,860,248 A | | 8/1989 | Lumelsky | |
| 4,884,220 A | * | 11/1989 | Dawson et al. | 345/573 |
| 5,485,624 A | * | 1/1996 | Steinmetz et al. | 712/34 |
| 5,539,527 A | * | 7/1996 | Kajimoto et al. | 386/52 |
| 5,911,078 A | * | 6/1999 | Anderson | 710/268 |
| 6,260,114 B1 | * | 7/2001 | Schug | 711/129 |

* cited by examiner

*Primary Examiner*—Mano Padmanabhan
*Assistant Examiner*—Mehdi Namazi
(74) *Attorney, Agent, or Firm*—Kenneth A. Haas

(57) ABSTRACT

Controller component (155) of system (100) generates address pattern (902) through employment of one or more parameters (205), to store information (810) at a plurality of parts of storage, for example, one or more instances of banked data memory (140) that are employable with multiprocessing. The one or more parameters (205) are related to the information (810).

30 Claims, 8 Drawing Sheets

EXEMPLARY TABLE 1

| | | |
|---|---|---|
| MEMORY LOCATION 0000: | S0 S4 S8 S12 S16 S20 S24 S28 | |
| MEMORY LOCATION 0001: | S1 S5 S9 S13 S17 S21 S25 S29 | |
| MEMORY LOCATION 0002: | S2 S6 S10 S14 S18 S22 S26 S30 | |
| MEMORY LOCATION 0003: | S3 S7 S11 S15 S19 S23 S27 S31 | |
| MEMORY LOCATION 0004: | S32 S36 S40 S44 S48 S52 S56 S60 | |
| MEMORY LOCATION 0005: | S33 S37 S41 S45 S49 ... | |

100

EXEMPLARY TABLE 2 /130

OPERAND FETCH 1A: {S0, S4, S8, S12, S16, S20, S24, S28}     (LOCATION 0, OFFSET =0)

OPERAND FETCH 1B: {S1, S5, S9, S13, S17, S21, S25, S29}     (LOCATION 1, OFFSET =0)

OPERAND FETCH 1C: {S2, S6, S10, S14, S18, S22, S26, S30}    (LOCATION 2, OFFSET =0)

OPERAND FETCH 1D: {S3, S7, S11, S15, S19, S23, S27, S31}    (LOCATION 3, OFFSET =0)

OPERAND FETCH 2A: {S4, S8, S12, S16, S20, S24, S28, S32}    (LOCATION 0/4, OFFSET =1)

OPERAND FETCH 2B: {S5, S9, S13, S17, S21, S25, S29, S33}    (LOCATION 1/5, OFFSET =1)

US 6,745,315 B2

GENERATION OF ADDRESS PATTERN THROUGH EMPLOYMENT OF ONE OR MORE PARAMETERS TO STORE INFORMATION AT PARTS OF STORAGE THAT ARE EMPLOYABLE WITH MULTIPROCESSING

TECHNICAL FIELD

The invention in one embodiment relates generally to communications and more particularly to information and signal processing.

BACKGROUND

Parallel processors are useful for many types of communications and multimedia signal processing. One challenge in working with one example of a parallel processing engine is keeping the parallel processing engine supplied with data. A failure to keep the parallel processing engine supplied with data disadvantageously prevents a realization of a number of benefits of parallel processing, such as a linear processing speedup.

A parallel processor comprises a number of processing elements, for instance, multipliers, adders, and the like. However, unless these processing elements are provided with the data at a correct time, these processing elements will disadvantageously go unused, for example, greatly reducing processing efficiency.

To obtain increased (e.g., maximum) processing speedup for a parallel computation, a single instruction-stream, multiple data-stream ("SIMD") processor in one example needs to access data samples in a single read cycle from memory. Non-unit strides through memory that serve to access non-adjacent data samples in specific patterns in one example present problems for management of the data upon reading. Exemplary communications system signal processing tasks that employ non-unit strides through memory in specific patterns include oversampled synchronization ("sync") correlation, fast Fourier transforms ("FFTs"), interpolation processes, and decimation processes.

Thus, a need exists for enhanced storage of information that is employed in multiprocessing. A further need exists for enhanced access to information that is employed in multiprocessing.

DETAILED DESCRIPTION

Figure 1:
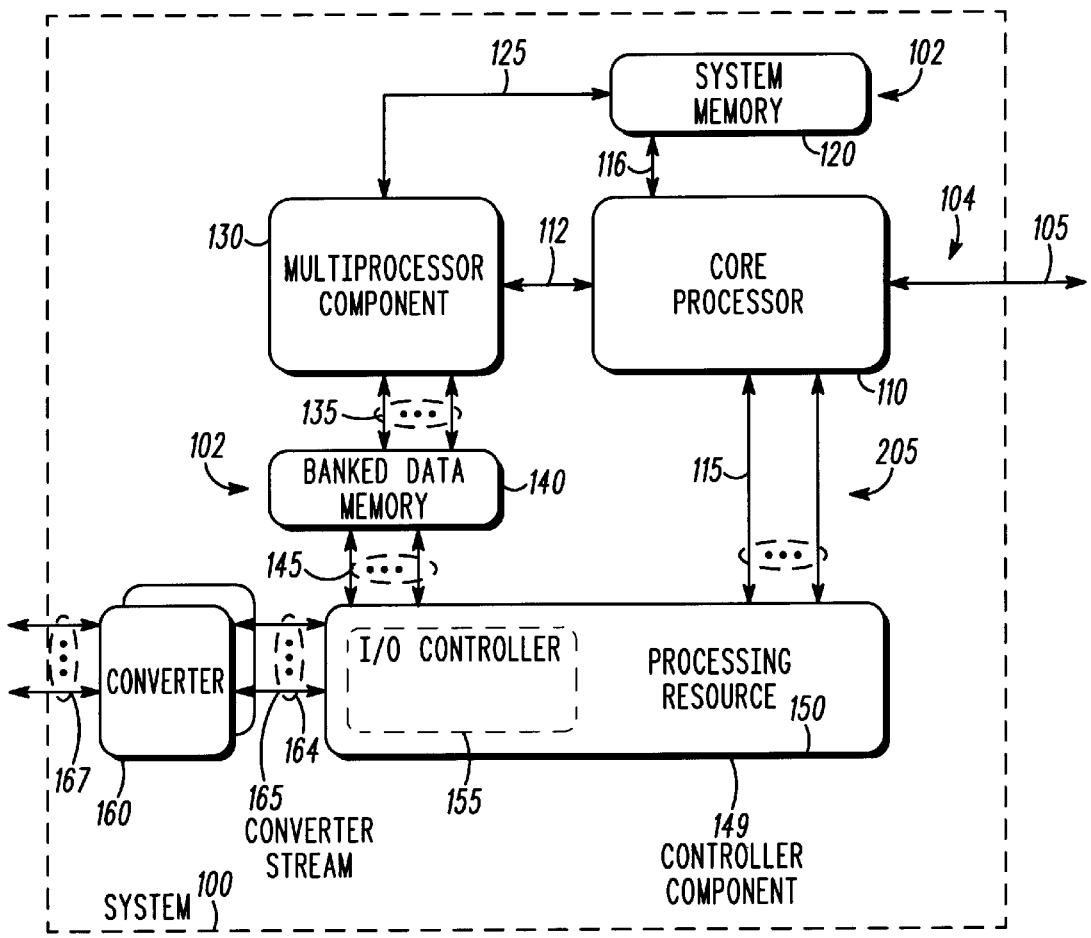
FIG. 1 is a functional block diagram of one example of a system that includes one or more instances of a passage, one or more instances of a core processor, one or more instances of a system memory, one or more instances of a multiprocessor component, one or more instances of a banked data memory, one or more instances of a controller component, and one or more instances of a converter.

Pursuant to one embodiment of the invention, shortcomings of the existing art are overcome and additional advantages are provided through the provision of generation of an (e.g., specific) address pattern through employment of one or more parameters to store information at parts of storage that are employable with multiprocessing.

Multiprocessing in one example comprises any arrangement of multi-ALU ("Arithmetic Logic Unit") processing, for example, vector processing, single instruction multiple data ("SIMD") processing, very long instruction word ("VLIW") processing, and multiple-core processing.

One or more parameters employed in one example relate to sampling characteristics of the information, physical memory design, and processing algorithms types. The sampling characteristics of the information in one example comprise the digital sampling rate, sample precision (e.g., in bits), and oversampling ratio or rate. Physical memory design parameters in one example comprise vector memory width, number of memory ports, and size of individual memory banks. The processing algorithm types in one example comprise oversampled synchronization ("sync") correlation, fast Fourier transforms ("FFTs"), interpolation processes, and decimation processes.

The invention in one embodiment encompasses a method. An address pattern is generated, through employment of one or more parameters, to store information at a plurality of parts of storage that are employable with multiprocessing. The one or more parameters are related to the information.

Another embodiment of the invention encompasses a system. The system includes a controller component that generates an address pattern, through employment of one or more parameters, to store information at a plurality of parts of storage that are employable with multiprocessing. The one or more parameters are related to the information. In one example, the controller component comprises an input/output ("I/O") controller component.

A further embodiment of the invention encompasses an article. The article includes a computer-readable signal-bearing medium. The article includes means in the medium for generating an address pattern, through employment of one or more parameters, to store information at a plurality of parts of storage that are employable with multiprocessing. The one or more parameters are related to the information.

The one or more parameters can be selected to comprise one or more of a sampling rate for the information, an oversampling rate for the information, a block size for the information, a sample precision for the information, and a type of intended processing for the information.

The information can be selected to comprise a plurality of portions. Non-consecutive instances of the plurality of portions of the information can be stored at consecutive instances of a plurality of parts of storage. The plurality of parts of storage can be selected to comprise multiple parts of storage that are employable with multiprocessing. Logically non-consecutive instances of the plurality of portions of the information can be stored at logically consecutive instances of the plurality of parts of storage. Non-consecutive instances of the plurality of portions of the information can be stored at contiguous instances of the plurality of parts of storage.

Consecutive instances of the plurality of portions of the information can be stored at non-consecutive instances of the plurality of parts of storage. Logically consecutive instances of the plurality of portions of the information can be stored at logically non-consecutive instances of the plurality of parts of storage. Consecutive instances of the plurality of portions of the information can be stored at non-contiguous instances of the plurality of parts of storage.

The one or more parameters can be employed to select the address pattern from a plurality of available address patterns for the plurality of parts of storage.

The information can comprise a plurality of related or unrelated portions. The plurality of related or unrelated portions of the information can comprise a first portion and a second portion. The first portion of the information and the second portion of the information can comprise non-consecutive instances of the plurality of related or unrelated portions of the information. The plurality of parts of storage can comprise a first part and a second part. The first part of the plurality of parts of storage and the second part of the plurality of parts of storage can comprise one or more of logically consecutive instances of the plurality of parts of storage and contiguous instances of the plurality of parts of storage. The address pattern can be selected to comprise an indication of a number of consecutive instances of the plurality of related or unrelated portions of the information to skip after a storing of the first portion of the information at the first part of the plurality of parts of storage for a storing of the second portion of the information at the second part of the plurality of parts of storage.

The first portion of the information can be different from the second portion of the information. The first part of the plurality of parts of storage can be different from the second part of the plurality of parts of storage. The address pattern can be selected to comprise an indication of a size of block for storage of the first portion of the information at the first part of the plurality of parts of storage and the second portion of the information at the second part of the plurality of parts of storage.

The address pattern can be employed to store the information at the plurality of parts of storage. The information from the plurality of parts of storage can be accessed to perform multiprocessing on the information.

The address pattern can comprise a first address pattern that is different from a second address pattern. The information can comprise first information that is different from second information. The plurality of parts of storage can comprise a first plurality of parts of storage that is different from a second plurality of parts of storage that are employable with multiprocessing. The second address pattern can be generated, through employment of one or more parameters, to store the second information at the second plurality of parts of storage that are employable with multiprocessing.

These and other features and advantages of one embodiment of the invention will become apparent from the description herein, the accompanying drawings, and the claims.

An exemplary embodiment of the invention advantageously improves a multiprocessing component's ability to process data at high throughput levels. This is desirable, for example, in advanced communication digital signal processor/processing ("DSP") systems. The invention in one embodiment advantageously allows a multiprocessing component to achieve increased (e.g., near maximum theoretical) processing rates or speedup, for instance, in one or more sample-based applications. In one example, this serves to effectively increase (e.g., by several times) the throughput for one or more exemplary communications signal processing algorithms.

A configurable I/O controller in one example provides a flexible and intelligent interface to a customized banked data memory system, allowing sample data to be properly packed into memory, for example, to readily facilitate complete utilization of the elements within a multiprocessing component, such as number of multipliers, adders, shifters, and the like. The banked data memory in one example represents parts of storage that are employable with multiprocessing. The configurable I/O controller in one example can generate specific address patterns. The high rate data movement and management tasks in one example are handled by the intelligence of the I/O controller, advantageously allowing the multiprocessing component to be utilized for more useful computational tasks. The configurable nature of the I/O controller in one example is useful for adapting to a (e.g., wide) variety of systems and data types. For example, an exemplary implementation of the invention with scalable SIMD processors desirably allows relatively high throughput communications digital signal processing.

In one example, the invention desirably enables implementation of flexible, high-throughput I/O controllers for signal processing in communications systems including, in example, one example communications systems that encounter a variety of oversample rates, data types, and precisions, for example, in sample-based processing requirements. A customized banked memory system and configurable I/O controller in one example advantageously serve to allow non-blocking full-rate access to (e.g., desired) sample data by a multiprocessing component.

An exemplary challenge in working with one example of a general purpose digital signal processor stems from one or more (e.g., sample bandwidth) limitations on I/O throughput. In one example, the performance of a multiprocessing component of advanced high data rate communication systems or wideband receiver structures with relatively high sampling rates, is undesirably decreased when the multiprocessing component is burdened with a data management task, for example, broadly resembling data shuffling. In contrast to one embodiment of the invention, previous implementations such as a number of interrupt-driven I/O schemes and their associated latencies or polling overhead, become (e.g., prohibitively) slow at high sample rates.

In one advantageous aspect of one embodiment of the invention, a configurable I/O controller and banked memory system serve to (e.g., completely) off-load from a multiprocessing component, the tasks of data movement and management. This in one example serves to desirably allow achievement of (e.g., much) increased processing throughput levels, for example, through advantageously higher multiprocessing element utilization, for instance, relative to one or more previous implementations of multiprocessors.

A detailed discussion of one exemplary embodiment of the invention is presented herein, for illustrative purposes.

Turning to FIG. 1, system 100, in one example, comprises a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102, such as one or more of a magnetic, electrical, optical, biological, and atomic data storage medium. Exemplary instances of recordable data storage medium 102 comprise system memory 120 and banked data memory 140. As described herein, system 100 in one example obtains one or more advantages for (e.g., common) signal processing tasks. An illustrative discussion of banked data memory 140 is presented herein. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, one or more instances of passage 104, one or more instances of core processor 110, one or more instances of system memory 120, one or more instances of multiprocessor component 130, one or more instances of banked data memory 140, one or more instances of controller component 149, and one or more instances of converter 160.

Figure 2:
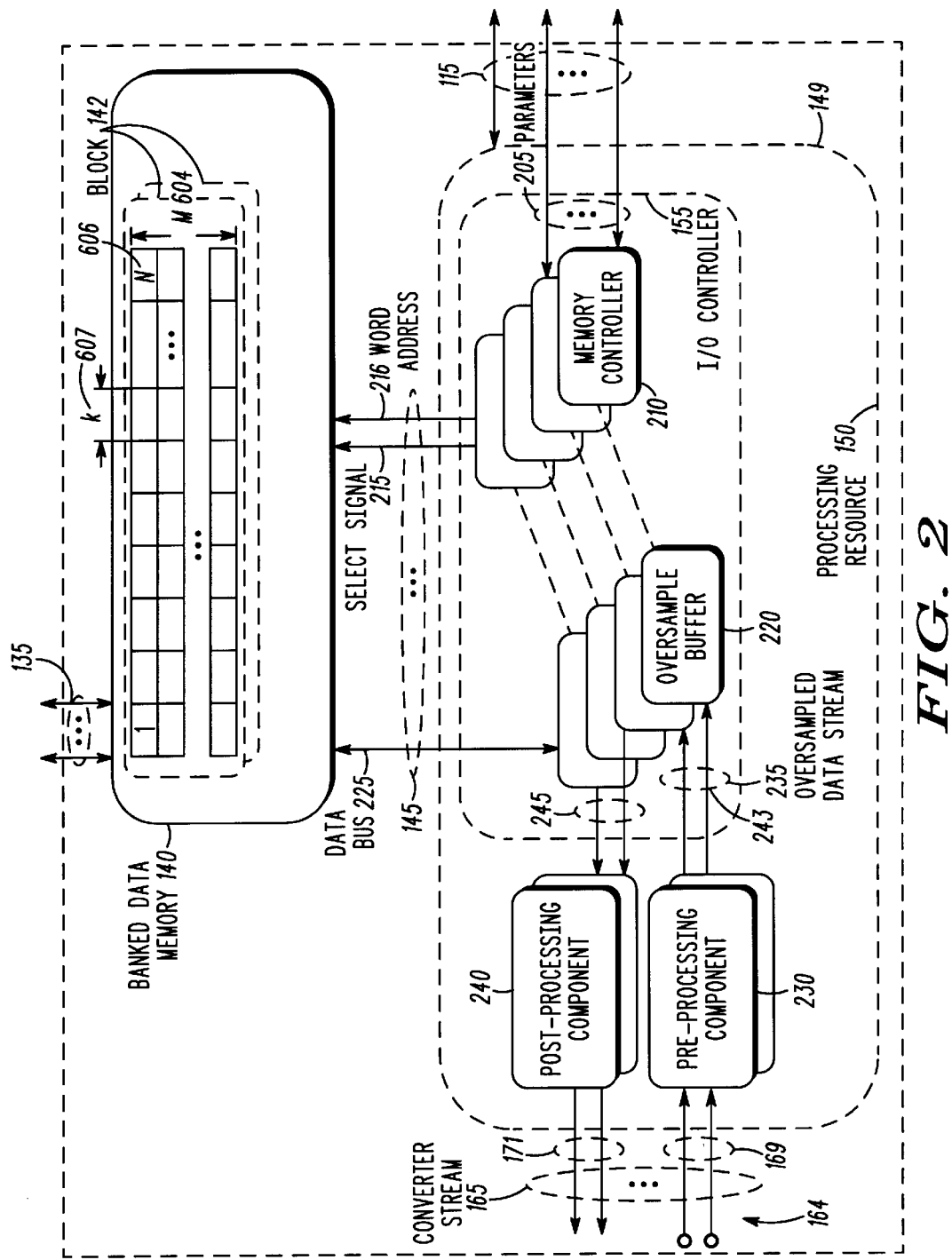
FIG. 2 represents one example of illustrative details of a banked data memory, a controller component, and a number of interfaces of the system of FIG. 1.

Referring further to FIG. 1, one or more instances of passage 104 in one example comprise a number of portions of one or more of an electrical path, an optical path, a wireless path, a wireline path, a hardware path, and a software path. Exemplary instances of passage 104 comprise passages 105, 112, 115–116, 125, 135, 145, 164, 167, 243 (FIG. 2), and 245 (FIG. 2).

Again referring to FIG. 1, passage 105 in one example allows core processor 110 to provide (e.g., an additional) input/output for system 100. In one example, passage 105 serves to transmit (e.g., configuration) information, control signals, and data. For example, the information is related to one or more instances of parameter 205 that are employed to generate (e.g., a specific instance of) address pattern 902 (FIG. 6), as described herein.

Figures 5, 6:
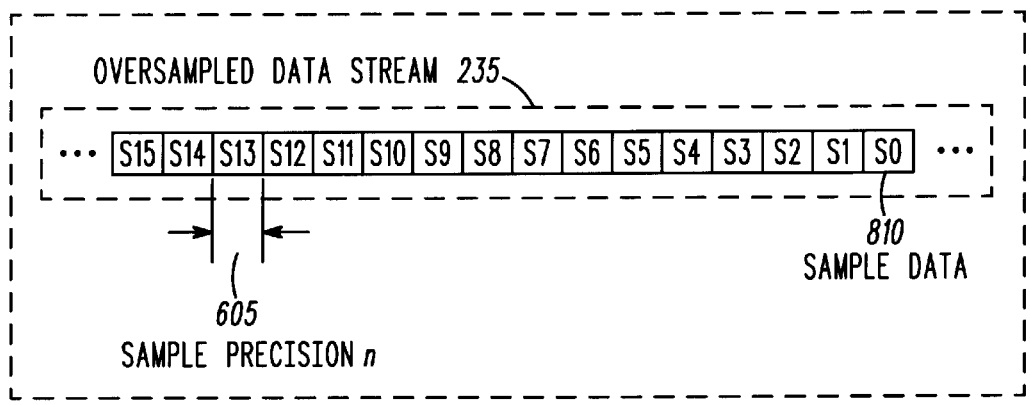
FIG. 5 represents illustrative details of another portion of a controller component of the system of FIG. 1.
FIG. 6 represents illustrative details of one portion of a banked data memory of the system of FIG. 1.

Referring to FIGS. 1 and 6, exemplary instances of parameter 205 comprise one or more of a sampling rate for the information, an oversampling rate for the information, a block size for the information, a sample precision for the information, and a type of intended processing for the information, as described herein. One or more instances of parameter 205 in one example are employed to select an instance of address pattern 902 from a plurality of available instances of address pattern 902, for example, for a plurality of parts of storage. In one example, passage 105 serves as an input/output port for core processor 110. Passage 105 in one example allows system 100 to be coupled to, for instance, memory, external busses, microprocessors, and the like, as will be appreciated by those skilled in the art.

Referring further to FIG. 1, passage 112 in one example serves to couple core processor 110 with one or more instances of multiprocessor component 130. For example, passage 112 comprises one or more busses that carry a combination of control signals and configuration information. Core processor 110 in one example comprises a digital signal processor/processing ("DSP") core.

Still referring to FIG. 1, controller component 149 in one example comprises one or more instances of processing resource 150. Passage 115 in one example serves to couple core processor 110 with one or more instances of processing resource 150. Passage 116 in one example serves to couple core processor 110 with one or more instances of system memory 120. Passage 125 in one example serves to couple multiprocessor component 130 with one or more instances of system memory 120. Passage 135 in one example serves to couple multiprocessor component 130 with one or more instances of banked data memory 140. Passage 145 in one example serves to couple processing resource 150 with one or more instances of banked data memory 140. Passage 164 in one example serves to couple processing resource 150 with one or more instances of converter 160. Passage 167 in one example serves to couple converter 160 with analog signals or components, radio frequency signals or components, digital busses, digital signals or hardware components (e.g., multiplexors "MUXes," application-specific integrated circuits "ASICs," field programmable gate arrays "FPGAs"), and the like. In another example, passage 167 serves as an input/output port for system 100, as will be appreciated by those skilled in the art.

Referring further to FIG. 1, converter 160 in one example comprises one or more analog-to-digital converters ("ADCs"), for example, that can provide data to be (e.g., eventually) stored in one or more instances of banked data memory 140. In another example, converter 160 comprises one or more digital-to-analog converters ("DACs").

Again referring to FIG. 1, one or more instances of passages 116 and 125 and system memory 120 in one example serve to transfer data processed by multiprocessor component 130 to core processor 110. In a further example, one or more instances of passages 116 and 125 and system memory 120 serve to transfer data to be processed by multiprocessor component 130 from core processor 110.

Referring to FIGS. 1–2, multiprocessor component 130 in one example serves to process one or more oversampled data streams 235. In one example, multiprocessor component 130 receives one or more oversampled data streams 235 over one or more instances of passage 135 from one or more instances of banked data memory 140. Passage 135 in one example comprises one or more busses that carry one or more data or control signals. Banked data memory 140 in one example receives one or more oversampled data streams 235 through communication with data channel oversample buffer 220 through employment of one or more instances of passage 145. Oversample buffer 220 in one example receives one or more oversampled data streams 235 over one or more instances of passage 243, as will be appreciated by those skilled in the art.

For example, referring to FIGS. 1–2, multiprocessor component 130 comprises a parallel coprocessor. In another example, multiprocessor component 130 comprises a scalable single instruction multiple data ("SIMD") processor.

Referring to FIGS. 1–2, one or more instances of banked data memory 140 in one example comprise one or more instances of block 142. Block 142 in one example comprises a logical representation of memory, for example, that comprises either contiguous or non-contiguous elements of memory. For example, one or more instances of banked data memory 140 comprise one or more instances of byte (e.g., eight-bit)-wide dual-port memory 760, as will be appreciated by those skilled in the art.

Figure 3:
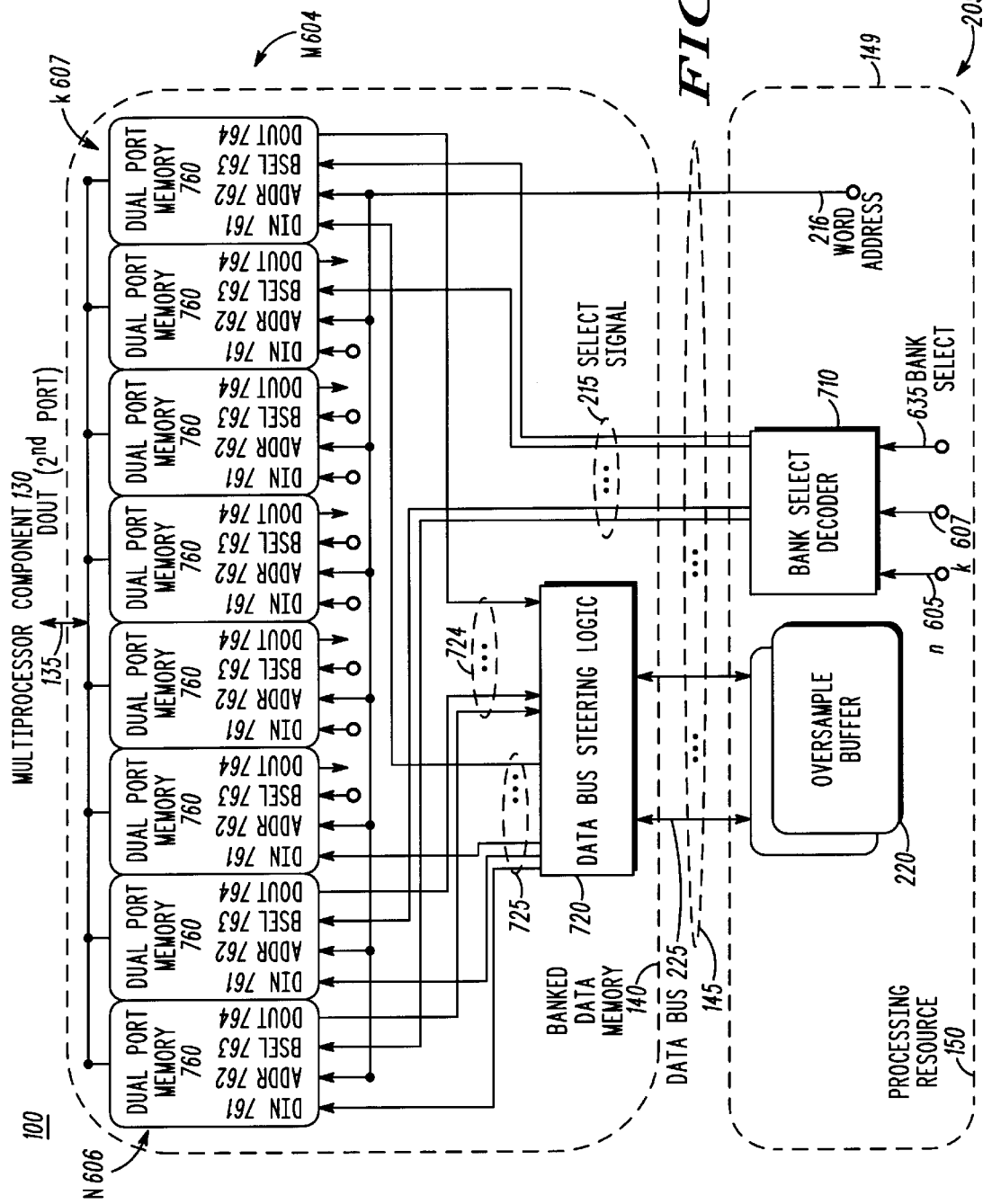
FIG. 3 represents a further example of illustrative details of a banked data memory, a controller component, and a number of interfaces of the system of FIG. 1.

Referring to FIGS. 2–3, block 142 in one example is related to parameters such as oversample rate M 604, k 607, and N 606, as described herein. Parameter k 607 in one example comprises the width of dual-port memory 760. Parameter N 606 in one example comprises the number of instances of dual-port memory 760.

Referring again to FIGS. 2–3, in one example, one or more instances of banked data memory 140 are coupled with processing resource 150 through employment of one or more instances of passage 145. Passage 145 in one example comprises one or more busses that carry one or more data or control signals. For example, passage 145 comprises one or more instances of data bus 225 that carry one or more instances of word address 216 and one or more instances select signal 215, as described herein.

Referring to FIGS. 1–2, processing resource 150 in one example comprises one or more instances of input/output ("I/O") controller 155, one or more instances of pre-processing component 230, and one or more instances of post-processing component 240. In one example, processing resource 150 comprises one or more programs. In another example, processing resource 150 is implemented with one or more programmable logic resources such as a field programmable gate array ("FPGA") or one or more dedicated logic resources such as an application-specific integrated circuit ("ASIC"), as will be appreciated by those skilled in the art.

Still referring to FIGS. 1–2, in one example, processing resource 150 performs one or more tasks. For example, processing resource 150 performs a task of (e.g., physically) routing oversampled data stream 235 in memory, for example, banked data memory 140. In a further example, processing resource 150 performs a task of (e.g., logically) mapping oversampled data stream 235 in memory, for example, banked data memory 140, as will be appreciated by those skilled in the art.

In one example, referring to FIGS. 1–2, processing resource 150 is coupled with core processor 110 through employment of one or more instances of passage 115. Passage 115 in one example comprises one or more busses that carry one or more control signals and configuration information, as will be appreciated by those skilled in the art.

For example, referring to FIGS. 2–3, passage 115 carries parameters 205. Parameters 205 in one example comprise configuration information. In one example, parameters 205 comprise sample precision n 605 and the width of data bus 225. In another example, parameters 205 comprise algorithmic parameters, for example, that are employable by multiprocessor component 130.

Figure 4:
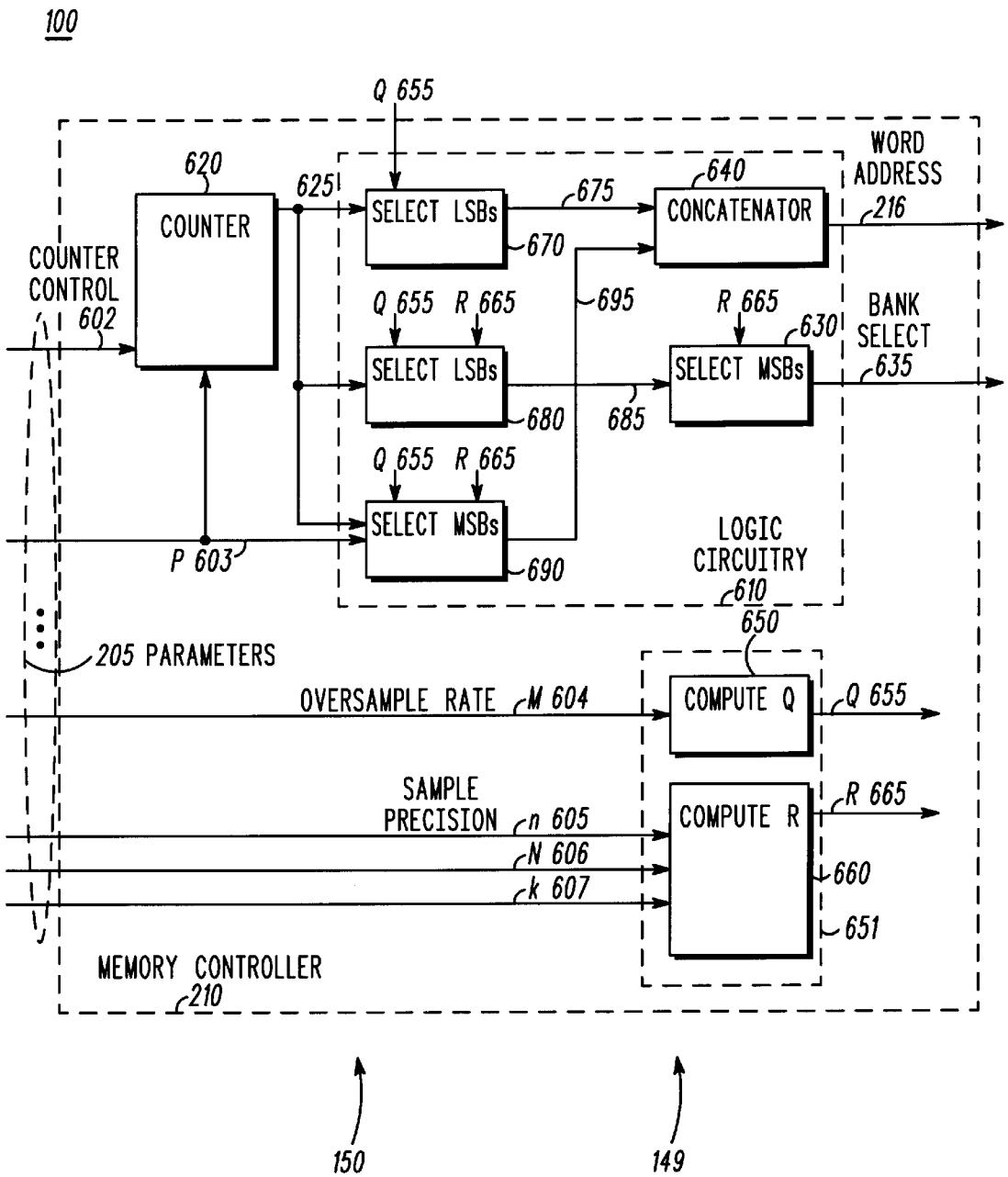
FIG. 4 represents illustrative details of one portion of a controller component and a number of interfaces of the system of FIG. 1.

Referring to FIGS. 2 and 4, in a further example, parameters 205 comprise configurable information such as the number (e.g., count) and/or width of instances of passage 145, oversample rate M 604, a type of (e.g., signal processing) algorithm for multiprocessor component 130, the configuration of one or more instances of banked data memory 140, and one or more characteristics of one or more instances of block 142. Exemplary characteristics of one or more instances of block 142 in one example comprise one or more of a size, start address, and stop address of one or more instances of block 142, for example, for storage of oversampled data stream 235 in banked data memory 140, as will be appreciated by those skilled in the art.

Now referring to FIGS. 4 and 6, memory controller 210 in one example generates an instance of address pattern 902 (e.g., an instance of word address 216 and an instance of bank select 635) for one or more instances of banked data memory 140, for example, based on parameters 205. Exemplary instances of parameters 205 comprise information such as an oversample rate M 604 of oversampled data stream 235 and sample precision n 605 of an instance of sample data 810, k 607, and N 606, P 603, and counter control 602.

Again referring to FIGS. 4 and 6, in one example, parameters 205 are related to the information, the physical design, and the signal processing algorithm. The sample rate in one example is related to P 603. Memory controller 210 in one example comprises one or more instances of sample data counter 620, one or more instances of configuration block 651, and one or more instances of logic circuitry 610. Logic circuitry 610 in one example can be modified to generate the (e.g., appropriate) instances of address pattern 902 for each signal processing algorithm, as will be appreciated by those skilled in the art.

Referring to FIG. 3, the smallest addressable unit of memory in one example is equal to the width of each individual memory bank, denoted k 607 (e.g., which equals 8-bits), of banked data memory 140. In one example, several memory banks (e.g., dual port memory 760) are concatenated, for example, to increase memory width and allow storage of larger vector words.

Referring further to FIG. 3, the number of memory banks in one example is denoted as N 606. For example, eight banks (N=8) of byte-wide (k=8) memory are utilized to form sixty-four-bit vector words. In one example, such an arrangement may be extended to any number of banks N 606 and memory widths k 607.

Referring again to FIG. 3, the sample data width (or size)/sample precision in one example is designated by n 605 (e.g., n=eight bits). The smallest data sample size n 605 in one example is equal to the width of each individual memory bank k 607, though the data sample size in one example may also be smaller than the width of each individual memory bank, as will be appreciated by those skilled in the art.

Still referring to FIG. 3, the desired oversample rate in one example is defined as M 604. Data channel oversample buffer 220 in one example can be utilized for temporary storage of the incoming oversampled data stream 235, for example, to accommodate memory latency or conflicts, or smaller sample data sizes. In one example, data channel oversample buffer 220 (e.g., by requirement) would provide a number of temporary storage elements equal to the oversampling rate M multiplied by the data bus width k divided by the sample precision n, as will be appreciated by those skilled in the art.

Referring to FIG. 4, memory controller 210 in one example generates word address 216 and bank select address 635 for one or more instances of banked data memory 140, for example, by modifying a subset of sample counter output 625. Sample counter 620 in one example employs a binary counter comprising P (603) bits, and produces sample counter output 625. Sample counter output 625 in one example comprises a P-bit output $\{c_{P-1}, c_{P-2}, \ldots c_1, c_0\}$. The total number of k-bit memory locations in one example is (e.g., generally or substantially) equal to or less than $2^P$, as will be appreciated by those skilled in the art.

Further referring to FIG. 4, sample counter 620 in one example employs counter control 602. In one example, counter control 602 comprises a reset signal. In a further example, counter control 602 comprises an initialization (preset or load signal) for sample counter 620 that, in one example, specifies the starting address within block 142 for storing sample data 810 and that, in another example, specifies which sample data 810 is to be selected for storage in block 142. In yet another example, counter control 602 comprises a block size (e.g., a number of samples suitable for multiprocessing component 130). In a still further example, counter control 602 comprises a list of available (e.g., physical and/or logical) locations for storing sample data 810.

Referring still to FIG. 4, a modification of sample counter output 625 in one example is achieved through employment of logic circuitry 610 and configuration block 651. Configuration block 651 in one example comprises blocks (e.g., block 650 and block 660) that in one example are responsive to functions that employ parameters 205. Block 650 in one example serves to generate signal Q 655, for example, by transforming oversample rate M 604, for instance, through employment of the relationship $Q=\log_2(M)$. Block 660 in one example serves to generate signal R 665, for example, by transforming the width of each individual memory bank k 607, the number of memory banks N 606, and sample precision n 605, for instance, through employment of the relationship $R=\log_2(N \times k/n)$.

Again referring to FIG. 4, logic circuitry 610 in one example selects a mid-portion of sample counter output 625, for example, to generate bank select address 635. In one example, logic circuitry 610 generates bank select address 635 through employment of select least-significant bit ("LSB") block 680 and select most-significant bit ("MSB") block 630, for example, to select a mid-portion of sample counter output 625. Select LSB block 680 in one example employs signals Q 655 and R 665, for example, to extract the Q+R LSBs of the sample counter output 625 and produce output 685. Select MSB block 630 in one example employs signal R 665, for example, to extract the R MSBs of output 685, for instance, to generate bank select address 635.

In another example, referring to FIG. 4, logic circuitry 610 serves to generate bank select address 635 by extracting bits $\{c_{R+Q-1}, c_{R+Q-2}, \ldots, c_Q\}$ from sample counter output 625. To generate word address 216, logic circuitry 610 in one example extracts (e.g., selected) portions of sample counter output 625. Select LSB block 670 in one example is responsive to signal Q 655 and serves to extract the Q LSBs of sample counter output 625, for example, to produce output 675.

Still referring to FIG. 4, select MSB block 690 in one example is responsive to P 603, signal Q 655, and signal R 665, and serves to extract the P-Q-R MSBs of sample counter output 625, for example, to produce output 695. Output 675 and output 695 in one example are combined, for example, through employment of concatenator 640, for instance, to produce word address 216. In a further example, logic circuitry 610 extracts bits $\{c_{P-1}, c_{P-2}, \ldots, c_{Q+R}, c_{Q-1}, \ldots, c_0\}$ from sample counter output 625, for example, to generate word address 216.

Referring to FIGS. 1–2, in one example, parameters 205 serve to increase flexibility of system 100, processing resource 150, and/or I/O controller 155, for example, by allowing adjustment based on the configuration of one or more portions of system 100. For example, I/O controller 155 can be tailored by using parameters 205 to increase (e.g., provide maximal) processor speedup. In another example, I/O controller 155 comprises a capability of handling a relatively small set of (e.g., common) cases, for example, one to four instances of oversampled data stream 235 and four, eight, or sixteen bits for sample precision n 605. In a further example, employment of one or more configurable and/or programmable instances of parameter 205 advantageously allows a relatively high degree of flexibility in selection of one or more interfaces for I/O controller 155, as will be appreciated by those skilled in the art.

Referring still to FIGS. 1–2, I/O controller 155 in one example comprises one or more instances of data channel oversample buffer 220 and one or more instances of memory controller 210. Data channel oversample buffer 220 in one example comprises a word buffer. In one example, I/O controller 155 performs one or more operations that are analogous to one or more operations performed in direct memory access ("DMA"), as will be appreciated by those skilled in the art. For example, I/O controller 155 controls operation of banked data memory 140 through employment of word address 216 and select signal 215. Memory controller 210 in one example controls operation of data channel oversample buffer 220. In a further example, one or more instances of I/O controller 155 are coupled (e.g., directly or indirectly via a pre-processing stage) to one or more instances of converter 160, for example, through employment of passage 164. Passage 164 in one example serves to carry one or more instances of converter stream 165. Converter stream 165 in one example comprises a plurality of portions, for example, stream portions 169 and 171.

Referring to FIG. 2, pre-processing component 230 in one example comprises an inline data pre-processing component such as a digital filter or correlator. In one example, pre-processing component 230 serves to process stream portion 169 and output one or more instances of oversampled data stream 235.

Referring to FIGS. 2–3 and 5, oversampled data stream 235 in one example comprises one or more instances of information such as sample data 810. Sample data 810 in one example comprises n bits each having sample precision 605. For exemplary purposes, sample data 810 can be labeled S0, S1, . . . , Si, where Si represents the (i+1)th element of sample data 810. In addition, S0 can represent the earliest (e.g., in time) element of sample data 810. In one example, oversampled data stream 235 comprises (e.g., logically, temporally) consecutive instances of sample data 810.

Referring still to FIGS. 2–3 and 5, I/O controller 155 in one example serves to pack sample data 810 into one or more instances of banked data memory 140. In one example, parameters 205 comprise information based on characteristics of sample data 810. For example, I/O controller 155 serves to (e.g., correctly) pack sample data 810 into one or more instances of banked data memory 140 based on one or more parameters 205, for instance, to obtain increased multiprocessing throughput.

Again referring to FIGS. 2–3 and 5, an illustrative description of exemplary implementation of one or instances of processing resource 150 and one or more instances of banked data memory 140 is now presented, for explanatory purposes. One or more instances of address pattern 902 in one example are employed for storing and/or reading sample data 810 into one or more instances of banked data memory 140. One or more instances of passage 145 in one example comprise one or more instances of data bus 225, one or more instances of word address 216, and one or more instances of select signal 215.

Still referring to FIGS. 2–3 and 5, one or more instances of banked data memory 140 in one example comprise one or more instances of a dual port memory 760. Dual port memory 760 in one example comprises data input ("DIN") port 761, data output ("DOUT") port 764, address ("ADDR") port 762, and bank (e.g., chip) select ("BSEL") port 763. Dual port memory 760 may include one or more connections instead of and/or in addition to the connections illustrated. Other forms of memory, such as single port memory (e.g., possibly with some form of bus arbitration) may be substituted for dual port memory 760, as will be appreciated by those skilled in the art.

Referring further to FIGS. 2–3 and 5, ADDR port 762 in one example is coupled to word address 216. Banked data memory 140 comprises one or more instances of data bus steering logic 720. Processing resource 150 in one example comprises one or more instances of bank select decoder 710. Bank select decoder 710 in one example is responsive to sample precision n 605, memory bank width k 607, and bank select address 635. In one example, bank select decoder 710 produces one or more instances of select signal 215. Select signal 215 in one example is coupled to BSEL port 763.

For example, referring to FIGS. 2–3 and 5, bank select decoder 710 allows (e.g., substantially simultaneous) writing or reading of multiple dual port memory elements 760, for instance, when sample precision n 605 exceeds memory bank width k 607. Bank select decoder 710 also may comprise a shifter such as for cases when sample precision n 605 exceeds memory bank width k 607 (e.g., n/k>1), which in one example (e.g., substantially) simultaneously enables multiple (e.g., n/k) adjacent dual port memory elements 760 and shifts bank select address 635 by n/k.

Still referring to FIGS. 2–3 and 5, data bus steering logic 720 in one example comprises muxing and demuxing circuitry. In a further example, data bus steering logic 720 is responsible for any arbitration of dual port memory 760 that needs to take place (e.g., through employment of traditional means such as a time division multiplexing, "TDM," or a round-robin bus arbitration scheme).

Referring again to FIGS. 2–3 and 5, data bus steering logic 720 in one example is coupled with DOUT port 764 of one or more instances of dual port memory 760, for example, via one or more instances of bus 724. In another example, data bus steering logic 720 is coupled with DIN port 761 of one or more instances of dual port memory 760, for example, via one or more instances of bus 725. In yet another example, bank select 635 and word address 216 allow data channel oversample buffer 220 to receive (e.g., read) contents of one or more instances of banked data memory 140, for example, in a pre-defined fashion using one or more instances of data bus 225, as will be appreciated by those skilled in the art.

Referring further to FIG. 2, post-processing component 240 in one example comprises an inline data post-processing component such as a digital filter. In one example, post-processing component 240 serves to process information carried by one or more instances of passage 245, to output stream portion 171 on passage 164.

Referring again to FIG. 2, I/O controller 155 in one example serves to direct stream portion 169 through one or more instances of pre-processing component 230, for example, to perform one or more tasks, for instance, for filtering and/or data conversion, as will be appreciated by those skilled in the art.

Still referring to FIGS. 1–2, one exemplary function of I/O controller 155 is to (e.g., efficiently) move information from, and/or based on, stream portion 169 through one or more instances of pre-processing component 230, and (e.g., eventually) into one or more instances of banked data memory 140, for example, as an instance of oversampled data stream 235, for example, to be accessed by multiprocessor component 130. Oversampled data stream 235 in one example is based on stream portion 169.

Again referring to FIGS. 1–2, I/O controller 155 in one example operates (e.g., autonomously) based on parameters 205. For example, I/O controller 155 serves to (e.g., properly) pack oversampled data stream 235 into one or more instances of banked data memory 140 based on parameters 205. In a further example, I/O controller 155 signals multiprocessor component 130 when I/O controller 155 has finished storing oversampled data stream 235 in an instance of block 142 of an instance of banked data memory 140, and the instance of block 142 of oversampled data stream 235 is (e.g., therefore) ready for processing by multiprocessor component 130.

Referring to FIGS. 1–3, I/O controller 155 in one example interfaces to a number N 606 instances of a dual-port memory 760. Number N 606 in one example comprises a positive integer that is related to the physical design characteristics of system 100. One or more instances of banked data memory 140 in one example comprise N 606 instances of byte (e.g., k=8 bits)-wide dual-port memory 760, resulting in an N×k-bit-wide data bus 225. The width of data bus 225 in one example equals the width of passage 135.

Further referring to FIGS. 1–3, system 100 in one example achieves (e.g., very) high input/output throughput rates. For example, in an instance of system 100 that comprises a banked data memory 140 which itself comprises eight instances of dual port memory 760 each comprising byte-wide, ten nanosecond ("ns") access time memory (e.g., for sixty-four-bit data paths), approximately eight hundred megabyte ("MB") per second of input/output throughput capability is (e.g., readily) achievable for several communication signal processing algorithms, as will be appreciated by those skilled in the art.

Referring to FIGS. 1–2, in one example, I/O controller 155 allows the proper data operands to be accessed by multiprocessor component 130, as described herein. In a further example, I/O controller 155 allows only the desired instances of banked data memory 140 to be accessed during data storage and retrieval, desirably reducing current drain when compared to other wide memory bus schemes. In another example, I/O controller 155 allows multiprocessor component 130 to operate at full rates advantageously unhindered by input/output access, as will be appreciated by those skilled in the art.

Still referring to FIGS. 1–2, I/O controller 155 in one example obtains increased parallel processing speedup in multiprocessor component 130 through employment of parameters 205, as will be appreciated by those skilled in the art.

For explanatory purposes, an illustrative description is now presented. As will be understood by those skilled in the art, in one exemplary design (not shown) that does not employ certain aspects of system 100, sample data (e.g., comprising four, eight, or sixteen bits) is processed at one or more oversampled rates M (e.g., sixteen times "16×," eight times "8×," four times "4×," or two times "2×") in the front-end of a communications system. One exemplary front-end processing algorithm attempts to reduce the oversampled data down to lower rates through employment of decimation or oversampled sync correlation methods, which require that data samples be accessed in a decimated fashion (e.g., by every M-th sample). Another exemplary algorithm relies on bit-reversed addressing schemes (e.g., fast Fourier transforms "FFTs") or other non-uniform memory access techniques that tend to greatly slow down (e.g., with data shuffling tasks) multiprocessing components that operate without the benefit of certain aspects of system 100. In a further exemplary design that does not employ certain aspects of system 100, bit-reversed addressing schemes can serve to provide limited improvement for FFTs.

In contrast to such designs, referring to FIGS. 1–2, system 100 in one example employs I/O controller 155 to (e.g., based on one or more parameters 205) prearrange oversampled data stream 235 in (e.g., proper) order in one or more instances of banked data memory 140, to advantageously allow multiprocessor component 130 to handle its computational tasks at full rates. Multiple oversampled data streams 235 in one example may be processed by I/O controller 155, whether the oversampled data streams 235 are related or not related. One example of related oversampled data streams 235 comprises inphase ("I-channel") and quadrature ("Q-channel") data from a sampled communications signal. One example of unrelated oversampled data streams 235 comprises data streams from multiple antennas in a communications system, as will be appreciated by those skilled in the art.

Referring to FIGS. 2 and 4, each instance of oversampled data stream 235 in one example is associated with an instance of data channel oversample buffer 220 and an instance of memory controller 210 of I/O controller 155. In one example, referring to FIGS. 2 and 4–5, for an oversample rate M 604 and an instance of sample data 810 with sample precision n 605, oversampled data stream 235 is packed into one or more instances of banked data memory 140 in one or more instances of a block 142 (e.g., each instance of block 142 occupying M 604 locations), with adjacent instances of sample data 810 in oversampled data stream 235 spaced by M 604. For example, each instance of block 142 comprises ((k×N)/n)×M samples.

Now referring to FIGS. 2 and 6, exemplary table 1 represents an illustrative organization of block 142. One or more instances of I/O controller 155 in one example serve to generate an instance of address pattern 902 for organizing oversampled data stream 235, using parameters 205 related to the information such as the oversample rate M 604, in one or more instances of banked data memory 140. In one example, I/O controller 155 serves to generate an instance of address pattern 902, for example, to place adjacent (e.g., consecutive) instances of sample data 810 into non-consecutive locations in block 142. In another example, I/O controller 155 serves to generate an instance of address pattern 902 to place non-consecutive instances of sample data 810 into consecutive locations in block 142.

Further referring to FIGS. 2 and 6, memory controller 210 in one example serves to generate an instance of address pattern 902 through employment of one or more parameters 205, to store sample data 810 (e.g., S0, S4, S8, S12, S16, S20, S24, S28) at a plurality of parts of storage, for example, one or more instances of banked data memory 140 that are employable with multiprocessing. The one or more parameters 205 contain information that configure I/O controller 155, as described herein. For example, referring to FIGS. 2 and 5–6, I/O controller 155 packs the sample data 810 into one or more instances of banked data memory 140 based on one or more parameters 205.

Again referring to FIGS. 2 and 6, in one example, one or more instances of multiprocessor component 130 employ one or more instances of an oversampled sync correlator or finite impulse response ("FIR") filter algorithm with T-spaced filter taps that operates on eight-bit (n=8), four-times (M=4) oversampled analog-to-digital converter ("ADC") input data. An exemplary T-spaced filter has its coefficients sampled at the information baud or symbol rate. Exemplary table 1 in one example represents an exemplary sync correlator stride packing example, as will be appreciated by those skilled in the art.

Figures 7, 8:
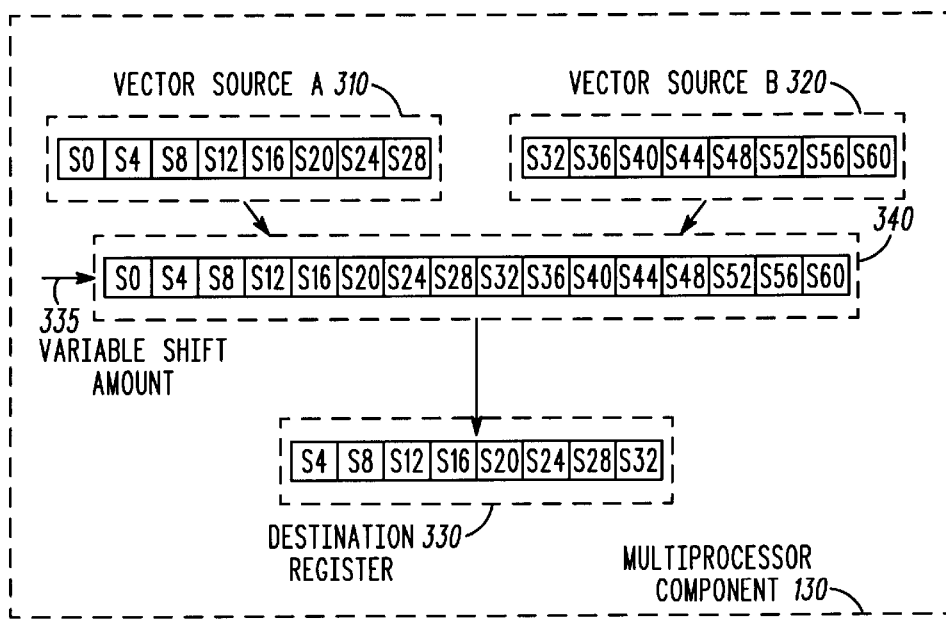
FIG. 7 represents illustrative details of one portion of a multiprocessor component of the system of FIG. 1.
FIG. 8 represents illustrative details of a further portion of a multiprocessor component of the system of FIG. 1.

In one example, referring to FIGS. 2 and 7, multiprocessor component 130 employs a load with j-bank offset instruction to access sample data 810, as represented in exemplary table 2. A load with j-bank offset operation in one example can be implemented with a crossbar switch in the memory interface. In another example, referring to FIGS. 2, 5, and 7, multiprocessor component 130 employs a concatenate and shift operation to access sample data 810. Such access to the sample data 810 by multiprocessor component 130 in one example is at full rate for loading and operating on N (e.g., eight) eight-bit (n=8) operands per instruction cycle, resulting in enhanced (e.g., maximum) data throughput, as will be appreciated by those skilled in the art.

Referring to FIGS. 2–3, 5, and 7, system 100 in one example configures I/O controller 155 and multiprocessor component 130 with the sample precision n 605 and decimation rate M 604 (e.g., two times "2×," four times "4×," eight times "8×," or sixteen times "16×") of the process. With this information, the desired sample data 810 in one example can be seamlessly accessed from the proper (e.g., possibly non-contiguous) memory banks without contention, as represented in exemplary table 2, and processed by the multiprocessing component 130, as will be appreciated by those skilled in the art.

Referring to FIGS. 2 and 7, "a, b, c, and d" of exemplary table 2 in one example represent memory fetches that are employable to obtain different sampling phases. In one example, only one of the four possible sampling phases is employed at a time. For example, operand 1a is fetched, followed by operand 2a, and so on, for instance, to mimic a shift register effect. In another example, memory location 0000 and memory location 0004 could be loaded into multiprocessor component 130, as will be appreciated by those skilled in the art.

Turning to FIG. 8, in one example, multiprocessor component 130 comprises vector source register A 310 and vector source register B 320. Vector source register A 310 and vector source register B 320, in one example, can be loaded using indirect offset addressing from banked data memory 140. In a further example, multiprocessor component 130 comprises concatenate and shift operator 340.

Again referring to FIG. 8, concatenate and shift operator 340 in one example serves to append the contents of vector source register B 320 to the contents of vector source register A 310, for example, before shifting the appended contents by a variable shift amount 335. Variable shift amount 335 in one example can represent a number of bytes to shift. The output of concatenate and shift operator 340 in one example is placed in a destination register 330.

Referring still to FIG. 8, destination register 330 in one example comprises either vector source register A 310 or vector source register B 320. In another example, destination register 330 comprises another register of multiprocessor component 130. Concatenate and shift operator 340 in one example serves to advantageously decrease power consumption, for example, since each data operand in one example is accessed from memory only a single time, as will be appreciated by those skilled in the art. The exemplary operations of FIG. 8 in one example can emulate the load with j-bank offset operation (FIG. 7), as will be appreciated by those skilled in the art.

Now referring to FIGS. 1–2, 6 and 9, system 100 in one example employs the exemplary stride packing of exemplary table 1, to emulate sync correlator 400. Sync correlator 400 in one example comprises exemplary physical sync correlator hardware. In one example, sync correlator 400 comprises one or more components, for example, one or more instances of delay element 410, one or more instances of multiplier 420, and one or more instances of adder 440.

Again referring to FIGS. 1–2 and 9, delay element 410 in one example comprises one or more instances of sample data 810. In one example, every fourth instance of sample data 810 needs to be accessed. In a further example, multiprocessor component 130 comprises a SIMD processor and all the desired instances of sample data 810 need to be present and contained within a single data vector, for example, to perform a desired multiplication (e.g., dot product) operation in a single clock cycle.

Figure 9:
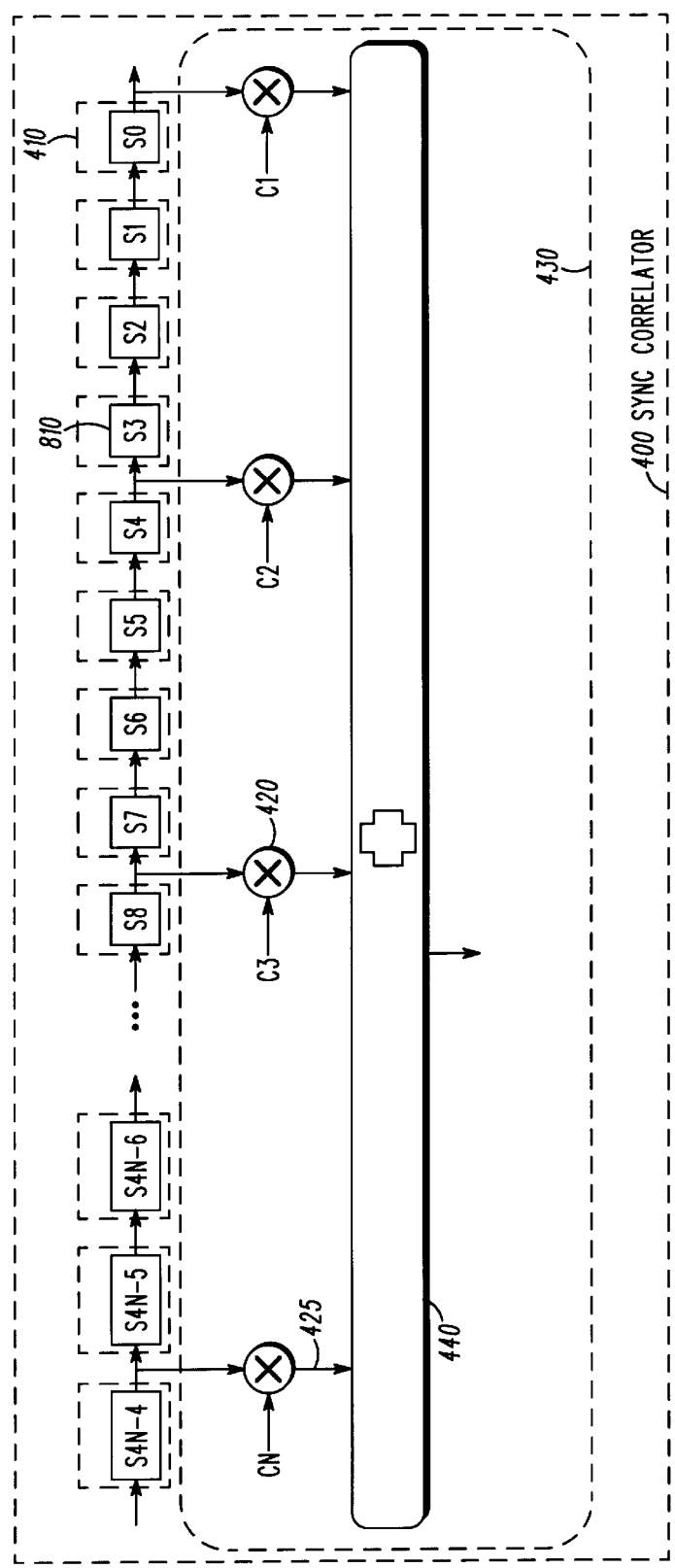
FIG. 9 represents illustrative details of a sync correlator that in one example can be emulated by the system of FIG. 1.

Still referring to FIGS. 1–2 and 9, in one example, once I/O controller 155 has (e.g., properly) packed sample data 810 into one or more instances of banked data memory 140, multiprocessor component 130 serves to load the desired sample data 810 with a single load instruction and then perform N multiply operations with one or more instances of the multiplier 420 in a single clock cycle, for example, to obtain one or more instances of multiplier product 425. N 606 in one example comprises a level of parallelism (e.g., of hardware multiplier resources) in multiprocessor component 130. Adder 440 in one example serves to sum a plurality of instances of multiplier product 425. Coefficient vector (C1, . . . , CN) in one example is pre-stored in packed format, for example, allowing the single instruction-stream, multiple data-stream multiplication and addition to take place in a single clock cycle 430.

Figure 10:
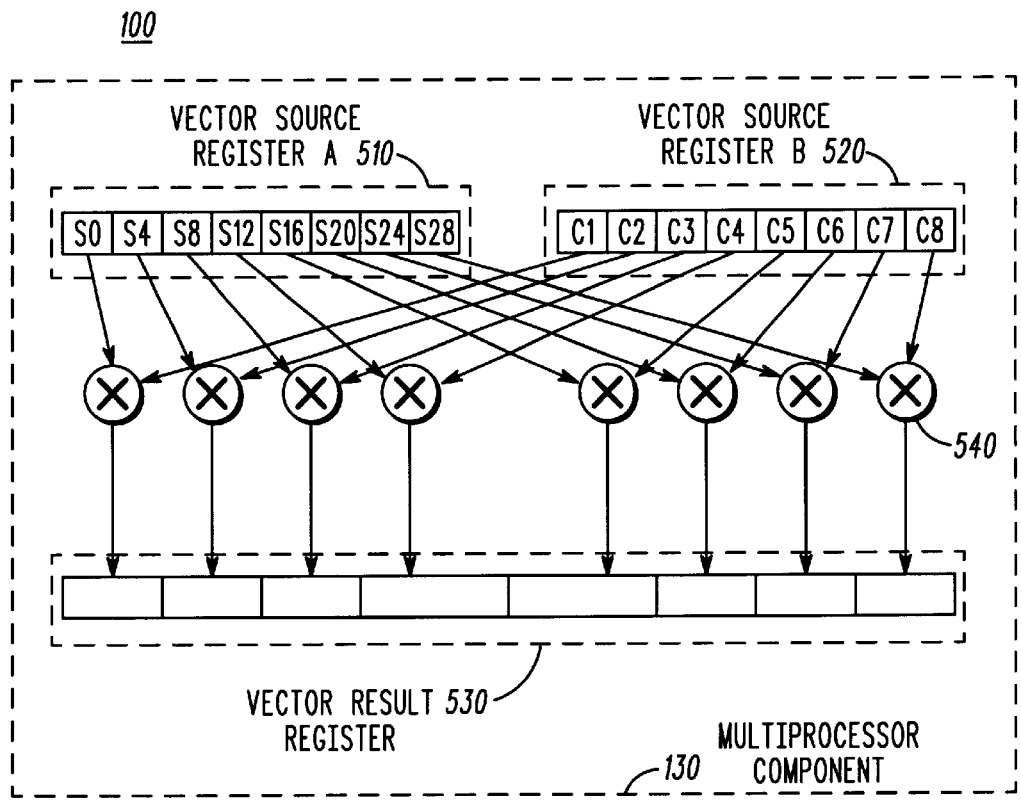
FIG. 10 represents illustrative details of a still further portion of a multiprocessor component of the system of FIG. 1.

Now referring to FIGS. 1–2 and 10, in one example, multiprocessor component 130 comprises components (e.g., elements) for a single instruction-stream, multiple data-stream multiplication. For example, multiprocessor component 130 comprises vector source register A 510 and vector source register B 520. Both vector source register A 510 and vector source register B 520 in one example comprise indexed elements.

Again referring to FIGS. 1–2 and 10, vector source register B 520 in one example comprises a desired coefficient vector (C1, . . . , CN). Vector source register A 510 in one example comprises the desired sample data 810 (S0, S4, S8, . . . , S28), for example, that has been advantageously stored in banked data memory 140, as described herein. In one example, multiprocessor component 130 can employ one or more instances of multiplier 540 to (e.g., substantially simultaneously) multiply the ith elements of the vector source register B 520 and vector source register A 510, for example, where i=1, . . . ,N, in one clock cycle. In one example, one or more instances of multiplier 540 serve to write the N products to vector result register 530. So, system 100 in one example (e.g., properly) stores sample data 810 in banked data memory 140, for example, while advantageously obviating a need for data shuffling tasks within multiprocessor component 130, as will be appreciated by those skilled in the art.

System 100 in one example ensures that only one memory request will be generated for each memory bank, allowing full-rate non-blocking data access, which eliminates a common problem with traditional banked memory access schemes. Other common communication signal processing algorithms (e.g., fast Fourier transforms, interpolation processes, and decimation processes) may also be similarly improved through ordered memory packing. I/O controller 155 in one example employs a relatively small instance of data channel oversample buffer 220 to properly pack the real-time sample data 810 into memory. The power consumption for such a banked memory scheme in one example is lower than a traditional wide data bus scheme since only small portions of memory need to be active during access by I/O controller 155. Exemplary advantages from system 100 in one example range from two to sixteen times throughput improvement. I/O controller 155 and the one or more instances of banked data memory 140 in one example allow the full speedup of the multiprocessing component 130 to be realized through an intelligent data management scheme based on the type of processing (algorithm) to be performed.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising the step of:

generating an address pattern for a banked data memory based on one or more parameters, to store information at a plurality of parts of storage that are employable with multiprocessing, wherein the one or more parameters are related to the information;

wherein the step of generating the address pattern based on the one or more parameters, to store the information at the plurality of parts of storage that are employable with multiprocessing comprises the step of:

selecting the one or more parameters comprising one or more of a sampling rate for the information, an oversampling rate for the information, and a sample precision for the information, and generating the address pattern for the banked data memory based on the one or more parameters.

2. The method of claim 1, wherein the step of generating the address pattern, through employment of the one or more parameters, to store the information at the plurality of parts of storage that are employable with multiprocessing comprises the steps of:

selecting the information to comprise a plurality of portions; and storing non-consecutive instances of the plurality of portions of the information at consecutive instances of the plurality of parts of storage.

3. The method of claim 2, wherein the step of generating the address pattern, through employment of the one or more parameters, to store the information at the plurality of parts of storage that are employable with multiprocessing and the step of storing the non-consecutive instances of the plurality of portions of the information at the consecutive instances of the plurality of parts of storage comprise one or more of the steps of:

selecting the plurality of parts of storage to comprise multiple parts of storage that are employable with multiprocessing;

storing logically non-consecutive instances of the plurality of portions of the information at logically consecutive instances of the plurality of parts of storage; and storing non-consecutive instances of the plurality of portions of the information at contiguous instances of the plurality of parts of storage.

4. The method of claim 1, wherein the step of generating the address pattern, through employment of the one or more parameters, to store the information at the plurality of parts of storage that are employable with multiprocessing comprises the steps of:

selecting the information to comprise a plurality of portions; and storing consecutive instances of the plurality of portions of the information at non-consecutive instances of the plurality of parts of storage.

5. The method of claim 4, wherein the step of storing the consecutive instances of the plurality of portions of the information at the non-consecutive instances of the plurality of parts of storage comprises one or more of the steps of:

selecting the plurality of parts of storage to comprise multiple parts of storage that are employable with multiprocessing;

storing logically consecutive instances of the plurality of portions of the information at logically non-consecutive instances of the plurality of parts of storage; and storing consecutive instances of the plurality of portions of the information at non-contiguous instances of the plurality of pans of storage.

6. The method of claim 1, wherein the step of generating the address pattern, through employment of the one or more parameters, to store the information at the plurality of pans of storage that are employable with multiprocessing comprises the step of:

employing the one or more parameters to select the address pattern from a plurality of available address patterns for the plurality of parts of storage.

7. The method of claim 1, wherein the information comprises a plurality of related or unrelated portions, wherein the plurality of related or unrelated portions of the information comprises a first portion and a second portion, wherein the first portion of the information and the second portion of the information comprise non-consecutive instances of the plurality of related or unrelated portions of the information, wherein the plurality of parts of storage comprise a first part and a second part, wherein the first part of the plurality of parts of storage and the second part of the plurality of parts of storage comprise one or more of logically consecutive instances of the plurality of parts of storage and contiguous instances of the plurality of parts of storage, wherein the step of generating the address pattern, through employment of the one or more parameters, to store the information at the plurality of parts of storage that are employable with multiprocessing comprises the step of:

selecting the address pattern to comprise an indication of a number of consecutive instances of the plurality of related or unrelated portions of the information to skip after a storing of the first portion of the information at the first part of the plurality of parts of storage for a storing of the second portion of the information at the second part of the plurality of parts of storage.

8. The method of claim 1, wherein the information comprises a first portion and a second portion, wherein the first portion of the information is different from the second portion of the information, wherein the plurality of parts of storage comprise a first part and a second part, wherein the first part of the plurality of parts of storage is different from the second part of the plurality of parts of storage, wherein the step of generating the address pattern, through employment of the one or more parameters, to store the information at the plurality of parts of storage that are employable with multiprocessing comprises the step of:

selecting the address pattern to comprise an indication of a size of block for storage of the first portion of the information at the first part of the plurality of parts of storage and the second portion of the information at the second part of the plurality of parts of storage.

9. The method of claim 1, wherein the step of generating the address pattern, through employment of the one or more parameters, to store the information at the plurality of parts of storage that are employable with multiprocessing comprises the steps of:

employing the address pattern to store the information at the plurality of parts of storage; and accessing the information from the plurality of parts of storage to perform multiprocessing on the information.

10. The method of claim 1, wherein the address pattern comprises a first address pattern that is different from a second address pattern, wherein the information comprises first information that is different from second information, wherein the plurality of parts of storage comprise a first plurality of parts of storage that is different from a second plurality of parts of storage that are employable with multiprocessing, and further comprising the step of:

generating the second address pattern, through employment of one or more parameters, to store the second information at the second plurality of parts of storage that are employable with multiprocessing.

11. A system, comprising:

a controller component that generates an address pattern for a banked-data memory, through employment of one or more parameters, to store information at a plurality of parts of storage that are employable with multiprocessing, wherein the one or more parameters are related to the information;

wherein the controller component that generates the address pattern, through employment of the one or more parameters, to store the information at the plurality of parts of storage that are employable with multiprocessing comprises:

a controller component that selects the one or more parameters to comprise one or more of a sampling rate for the information, an oversampling rate for the information, and a sample precision for the information.

12. The system of claim 11, wherein the controller component that generates the address pattern, through employment of the one or more parameters, to store the information at the plurality of parts of storage that are employable with multiprocessing comprises:

a controller component that selects the information to comprise a plurality of portions; and a controller component that stores non-consecutive instances of the plurality of portions of the information at consecutive instances of the plurality of parts of storage.

13. The system of claim 12, wherein the controller component that generates the address pattern, through employment of the one or more parameters, to store the information at the plurality of parts of storage that are employable with multiprocessing and the controller component that stores the non-consecutive instances of the plurality of portions of the information at the consecutive instances of the plurality of parts of storage comprise one or more of:

a controller component that selects the plurality of parts of storage to comprise multiple parts of storage that are employable with multiprocessing;

a controller component that stores logically non-consecutive instances of the plurality of portions of the information at logically consecutive instances of the plurality of parts of storage; and a controller component that stores non-consecutive instances of the plurality of portions of the information at contiguous instances of the plurality of parts of storage.

14. The system of claim 11, wherein the controller component that generates the address pattern, through employment of the one or more parameters, to store the information at the plurality of parts of storage that are employable with multiprocessing comprises;

a controller component that selects the information to comprise a plurality of portions; and a controller component that stores consecutive instances of the plurality of portions of the information at non-consecutive instances of the plurality of parts of storage.

15. The system of claim 14, wherein the controller component that stores the consecutive instances the plurality of portions of the information at the non-consecutive instances of the plurality of parts of storage comprises one or more of:

a controller component that selects the plurality of pans of storage to comprise multiple pans of storage that are employable with multiprocessing;

a controller component that stores logically consecutive instances of the plurality of portions of the information at logically non-consecutive instances of the plurality of parts of storage; and a controller component that stores consecutive instances of the plurality of portions of the information at non-contiguous instances of the plurality of parts of storage.

16. The system of claim 11, wherein the controller component that generates the address pattern, through employment of the one or more parameters, to store the information at the plurality of parts of storage that are employable with multiprocessing comprises:

a controller component that employs the one or more parameters to select the address pattern from a plurality of available address patterns for the plurality of parts of storage.

17. The system of claim 11, wherein the information comprises a plurality of related or unrelated portions, wherein the plurality of related or unrelated portions of the information comprises a first portion and a second portion, wherein the rust portion of the information and the second portion of the information comprise non-consecutive instances of the plurality of related or unrelated portions of the information, wherein the plurality of parts of storage comprise a first part and a second part, wherein the first part of the plurality of parts of storage and the second part of the plurality of parts of storage comprise one or more of logically consecutive instances of the plurality of parts of storage and contiguous instances of the plurality of parts of storage, wherein the controller component that generates the address pattern, through employment of the one or more parameters, to store the information at the plurality of parts of storage that are employable with multiprocessing comprises:

a controller component that selects the address pattern to comprise an indication of a number of consecutive instances of the plurality of related or unrelated portions of the information to skip after a storing of the first portion of the information at the first part of the plurality of parts of storage for a storing of the second portion of the information at the second part of the plurality of parts of storage.

18. The system of claim 11 wherein the information comprises a first portion and a second portion, wherein the first portion of the information is different from the second portion of the information, wherein the plurality of parts of storage comprise a first part and a second part, wherein the first part of the information is different from the second part of the information, wherein the controller component that generates the address pattern, through employment of the one or more parameters, to store the information at the plurality of parts of storage that are employable with multiprocessing comprises:

a controller component that selects the address pattern to comprise an indication of a size of block for storage of the first portion of the information at the first part of the plurality of parts of storage and the second portion of the information at the second part of the plurality of parts of storage.

19. The system of claim 11, wherein the controller component that generates the address pattern, through employment of the one or more parameters, to store the information at the plurality of parts of storage that are employable with multiprocessing comprises:

a controller component that employs the address pattern to store the information at the plurality of parts of storage; and a multiprocessor component that accesses the information from the plurality of parts of storage to perform multiprocessing on the information.

20. The system of claim 11, wherein the address pattern comprises a first address pattern that is different from a second address pattern, wherein the information comprises first information that is different from second information, wherein, the plurality of parts of storage comprise a first plurality of parts of storage that is different from a second plurality of parts of storage that are employable with multiprocessing, and further comprising:

a controller component that generates the second address pattern, through employment of one or more parameters, to store the second information at the second plurality of parts of storage that are employable with multiprocessing.

21. An article, comprising:

a computer-readable signal-bearing medium;

means in the medium for generating a banked data memory address pattern, through employment of one or more parameters, to store information at a plurality of parts of storage that are employable with multiprocessing, wherein the one or more parameters are related to the information wherein the means in the medium for generating the address pattern, through employment of the one or more parameters, to store the information at the plurality of parts of storage tat are employable with multiprocessing comprises:

means in the medium for selecting the one or more parameters to comprise one or more of a sampling rate for the information, an oversampling rate for the information, and a sample precision for the information.

22. The article of claim 21, wherein the means in the medium for generating the address pattern, through employment of the one or more parameters, to store the information at the plurality of parts of storage that are employable with multiprocessing comprises:

means in the medium for selecting the information to comprise a plurality of portions; and means in the medium for storing non-consecutive instances of the plurality of portions of the information at consecutive instances of the plurality of parts of storage.

23. The article of claim 22, wherein the means in the medium for generating the address pattern, through employment of the one or more parameters, to store the information at the plurality of parts of storage that are employable with multiprocessing and the means in the medium for storing the non-consecutive instances of the plurality of portions of the information at the consecutive instances of the plurality of parts of storage comprise one or more of:

means in the medium for selecting the plurality of parts of storage to comprise multiple parts of storage that are employable with multiprocessing;

means in the medium for storing logically non-consecutive instances of the plurality of portions of the information at logically consecutive instances of the plurality of parts of storage; and means in the medium for storing non-consecutive instances of the plurality of portions of the information at contiguous instances of the plurality of parts of storage.

24. The article of claim 21, wherein the means in the medium for generating the address pattern, through employment of the one or more parameters, to store the information at the plurality of parts of storage that are employable with multiprocessing comprises:

means in the medium for selecting the information to comprise a plurality of portions; and means in the medium for storing consecutive instances of the plurality of portions of the information at non-consecutive instances of the plurality of parts of storage.

25. The article of claim 24 wherein the means in the medium for storing the consecutive instances of the plurality of portions of the information at the non-consecutive instances of the plurality of parts of storage comprises one or more of:

means in the medium for selecting the plurality of parts of storage to comprise multiple parts of storage that are employable with multiprocessing;

means in the medium for storing logically consecutive instances of the plurality of portions of the information at logically non-consecutive instances of the plurality of pans of storage; and means in the medium for scoring consecutive instances of the plurality of portions of the information at non-contiguous instances of the plurality of parts of storage.

26. The article of claim 21, wherein the means in the medium for generating the address pattern, through employment of the one or more parameters, to store the information at the plurality of parts of storage that are employable with multiprocessing comprises:

means in the medium for employing the one or more parameters to select the address pattern from a plurality of available address patterns for the plurality of parts of storage.

27. The article of claim 21, wherein the information comprises a plurality of related or unrelated pardons, wherein the plurality of related or unrelated portions of the information comprises a first portion and a second portion, wherein the first portion of the information and the second portion of the information comprise non-consecutive instances of the plurality of related or unrelated portions of the information, wherein the plurality of parts of storage comprise a first part and a second part, wherein the first part of the plurality of parts of storage and the second part of the plurality of parts of storage comprise one or more of logically consecutive instances of the plurality of parts of storage and contiguous instances of the plurality of parts of storage, wherein the means in the medium for generating the address pattern, through employment of the one or more parameters, to store the information at the plurality of parts of storage that are employable with multiprocessing comprises:

means in the medium for selecting the address pattern to comprise an indication of a number of consecutive instances of the plurality of related or unrelated portions of the information to skip after a storing of the first portion of the information at the first part of the plurality of parts of storage for a storing of the second portion of the information at the second part of the plurality of parts of storage.

28. The article of claim 21, wherein the information comprises a first portion and a second portion, wherein the first portion of the information is different from the second portion of the information, wherein the plurality of parts of storage comprise a first part and a second part, wherein the first part of the plurality of parts of storage is different from the second part of the plurality of parts of storage, wherein the means in the medium for generating the address pattern, through employment of the one or more parameters, to store the information at the plurality of parts of storage that are employable with multiprocessing comprises:

means in the medium for selecting the address pattern to comprise an indication of a size of block for storage of the first portion of the information at the first part of the plurality of parts of storage and the second portion of the information at the second part of the plurality of parts of storage.

29. The article of claim 21, wherein the means in the medium for generating the address pattern, through employment of the one or more parameters, to store the information at the plurality of parts of storage that are employable with multiprocessing comprises:

means in the medium for employing the address pattern to store the information at the plurality of parts of storage; and means in the medium for accessing the information from the plurality of parts of storage to perform multiprocessing on the information.

30. The article of claim 21, wherein the address pattern comprises a first address pattern that is different from a second address pattern, wherein the information comprises first information that is different from second information, wherein the plurality of parts of storage comprise a first plurality of parts of storage that is different from a second plurality of parts of storage that are employable with multiprocessing, and further comprising:

means in the medium for generating the second address pattern, through employment of one or more parameters, to store the second information at the second plurality of parts of storage that are employable with multiprocessing.

* * * * *